United States Patent Office 3,359,270
Patented Dec. 19, 1967

3,359,270
PREPARATION OF SUBSTITUTED
PIPERAZINIUM SALTS
Clarence R. Dick, Lake Jackson, Tex., assignor to The Dow Chemical Company, Midland, Mich., a corporation of Delaware
No Drawing. Filed Nov. 16, 1965, Ser. No. 508,137
6 Claims. (Cl. 260—268)

This invention relates to a process for preparing 1,1,4-trisubstituted piperazinium salts.

The preparation of piperazine by dimerization of aziridine (ethylenimine) has long been known to the art. Quite logically, the preparation of substituted piperazinium salts has proceeded from substituted piperazines. But the latter reactions are less than satisfactory for commercial practice because they are multi-step, give only moderate yields, and produce a variety of by-products.

It has now been discovered that 1,1,4-trisubstituted piperazinium halides can be obtained by a single-step process in high yields essentially free of undesired by-products. These piperazinium salts are useful as curing agents for epoxy resins. They are also useful as intermediates and for their activities in modified degrees in the medical and veterinary applications of the piperazines.

This novel process in its broadest aspect comprises the reaction of an N-substituted aziridine with a haloethyl amine in accord with the following reaction scheme:

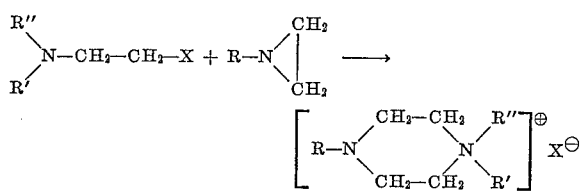

wherein R is a hydrocarbon radical conferring on the N-substituted aziridine a $K_B$ value greater than $10^{-8}$, R' and R'' are hydrocarbon radicals containing from 1 to about 20 carbon atoms, and X is chlorine bromine or iodine.

The hydrocarbon substituent on the aziridine nitrogen can be defined in terms of the $K_B$ value of the thus substituted aziridine in view of the discovery that aziridines having relatively low $K_B$ values were substantially inoperative in this process. The N-substituent is constituted as desired within the foregoing limitation to give the appropriate substituent at R on the piperazine nucleus. Advantageously, R is a hydrocarbon group containing 1 to about 10 carbon atoms, such as cycloalkyl (e.g. cyclopentyl, cyclohexyl), alkenyl (e.g., allyl, vinyl), alkynyl (e.g., ethynyl, propynyl), aralkyl (e.g., benzyl, phenylethyl), aryl (e.g., phenyl) and the like. Preferred, however, are the alkyl groups containing 1 to about 10 carbon atoms (e.g., methyl, ethyl, propyl, isopropyl, butyl, sec-butyl, t-butyl, decyl and the like).

A principal difficulty in conducting the conversion of N-substituted aziridines to substituted piperazinium salts is averting polymerization to a polyaziridine as the dominant reaction. Studies in conjunction with this invention have shown the necessity for a halide in piperazine formation, and this is conveniently supplied in the form of the selected haloethyl amine. These haloethyl amines can be disubstituted with independently selected alkyl, alkenyl or aralkyl groups as defined above, alkyl being preferred.

The reaction will proceed at temperatures above about −10° C., e.g., to the boiling temperature of the reaction mixture, although a range of about 20 to about 60° C. is preferred. Such reaction should generally be permitted to continue until the halide has been substantially consumed in order to maximize yields. Progress of the reaction is conveniently checked at intervals by gas-liquid chromatography. A reaction time of ten minutes to 18 hours is generally employed.

Presence of the N-substituted aziridine in moderate excess favors high yields. While stoichiometric amounts of the N-substituted aziridine and halide (i.e., two moles and one mole, respectively) are operative, a molar ratio of about 6:1 to 12:1 of N-substituted aziridine to halide produces a more satisfactory reaction. Excess N-substituted aziridine beyond a molar ratio of about 12:1 is generally to be avoided because of product loss during recovery and, on occasions, the formation of polymeric by-products. A ratio of about 10:1 preferred.

In general, non-aqueous solvents for the reactants are preferred. The usual organic solvents, such as the lower alcohols (e.g., ethanol, propanol) and ketones (e.g. acetone, methylethyl ketone), are normally acceptable. Water alone is to be avoided as favoring polymerization, although the presence of small amounts usually can be tolerated. No special sequence of mixing need be observed, and recovery of the reaction product is by conventional methods.

An outstanding feature of this reaction is the high yields of product obtained. Based on starting halide, yields generally are above 50 percent and in most cases exceed 90 percent or are virtually quantitative, as will be noted below.

The following examples illustrate the process of this invention but are not intended to limit its scope:

*Example 1.—1,1-dimethyl-4-(2-phenylethyl) piperazinium chloride*

To a reaction vessel equipped with means for stirring and temperature control were charged 500 ml. of acetone, 5.37 gm. of dimethyl chloroethylamine and 74 gm. of 1-(2-phenylethyl)aziridine. The reaction mixture was maintained at 25° C. for 48 hours and then heated to remove volatiles. The product remaining was washed with diethyl ether and dried to give 2.8 gm. of 1,1-dimethyl-4-(2-phenylethyl)piperazinium chloride, M.P. 254–256° C.

*Analysis.*—Calculated, nitrogen, 11.0 percent. Found: nitrogen 11.0 percent.

*Example 2.—1,1-dimethyl-4-ethylpiperazinium chloride*

Following the procedure of Example 1, a 10:1 molar excess of ethyl aziridine over dimethyl chloroethylamine produced, in a yield of 99 percent of theoretical, substantially pure 1,1-dimethyl-4-ethylpiperazinium chloride, M.P. 234–237° C.

*Analysis.*—Calculated, nitrogen, 9.41 percent. Found, nitrogen, 9.66 percent.

Substitution of other alkyl and aralkyl aziridines, as well as N-cycloalkyl, alkenyl, alkynyl and aryl aziridines for the phenylethyl and ethyl aziridines of the foregoing examples is productive of the correspondingly substituted piparzinium salts, these substituent groups remaining intact in the reactions of the invention. Likewise, replacing the haloethyl amines employed above with other dialkyl, dialkenyl or diaralkyl substituted haloethyl amines as defined above, including chloro, bromo or iodo halogens, yields correspondingly substituted products.

To one skilled in the art, it will be apparent from the foregoing description that selection of the N-substituent on the aziridine nucleus is not critical so long as it is essentially non-reactive under process conditions. It will also be clear that the process itself, while advantageously embodying obvious modifications with different reactants, follows the exemplified reactions closely for all reactants within the scope disclosed.

What is claimed is:

1. A process for preparing a 1,1,4-trisubstituted piperazinium halide which comprises: reacting (1) an N-substituted aziridine of the formula

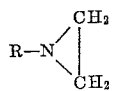

wherein R is a hydrocarbon radical conferring on said N-substituted aziridine a $K_B$ value greater than about $10^{-8}$, with (2) a haloethyl amine of the formula

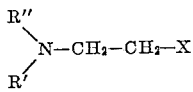

wherein R' and R" are hydrocarbon radicals containing from 1 to about 20 carbon atoms, and X is chlorine, bromine or iodine, to give a 1,1,4-trisubstituted piperazinium salt of the formula

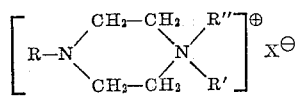

wherein R, R', R" and X are as above defined.

2. The process of claim 1 wherein the reaction is conducted at a temperature above about $-10°$ C.

3. The process of claim 1 wherein the reacion is conducted in the presence of excess N-substituted aziridine less than a molar excess of about 12:1 N-substituted aziridine to haloethylamine.

4. The process of claim 1 wherein R, R' and R" are alkyl groups containing from 1 to about 20 carbon atoms.

5. The process of claim 4 wherein the reaction is conducted with a molar excess of about 6:1 to about 12:1 N-substituted aziridine over haloethylamine.

6. A process for preparing a 1,1,4-trisubstituted piperazinium halide which comprises: (1) reacting (a) an N-substituted aziridine of the formula

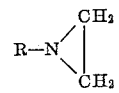

wherein R is an alkyl radical conferring on said N-substituted aziridine a $K_B$ value greater than about $10^{-8}$, with (b) a haloethyl amine of the formula

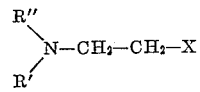

wherein R' and R" are alkyl radicals containing from 1 to about 20 carbon atoms, and X is chlorine, bromine or iodine, the molar ratio of N-substituted aziridine to haloethyl amine being about 6:1 to 12:1, at a temperature between about 20 and about 60° C. and in a nonaqueous solvent, said reaction being permitted to continue until substantially all the halide has been consumed, and (2) separating from the reaction mixture the thus-produced 1,1,4-trisubstituted piperazinium halide of the formula

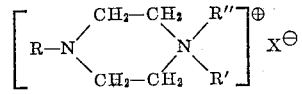

wherein R, R', R" and X are as above defined.

References Cited

UNITED STATES PATENTS 3,324,130   6/1967   Ham et al. _____ 260—268

HENRY R. JILES, *Primary Examiner.*